(12) United States Patent
Henifin

(10) Patent No.: US 7,197,875 B2
(45) Date of Patent: Apr. 3, 2007

(54) HYDRAULIC CYLINDER WITH COAXIAL, IN-LINE RESERVOIR

(76) Inventor: Philip S. Henifin, 22629 87th Ave. W., Edmonds, WA (US) 98026

(*) Notice: Subject to any disclaimer, the term of this patent is extended or adjusted under 35 U.S.C. 154(b) by 0 days.

(21) Appl. No.: 11/088,490

(22) Filed: Mar. 24, 2005

(65) Prior Publication Data

US 2006/0213192 A1   Sep. 28, 2006

(51) Int. Cl.
B60T 11/26 (2006.01)
F16J 15/16 (2006.01)

(52) U.S. Cl. .............. 60/584; 60/592; 92/81; 92/174

(58) Field of Classification Search ........... 60/583, 60/584, 589, 592; 92/58.1, 81, 82, 162 R, 92/174, 182
See application file for complete search history.

(56) References Cited

U.S. PATENT DOCUMENTS

| | | | |
|---|---|---|---|
| 1,963,114 A | 6/1934 | Bowen | |
| 2,239,673 A | 4/1941 | Fowler | |
| 2,268,624 A * | 1/1942 | Schwarz | 92/82 |
| 2,500,502 A * | 3/1950 | Vogel | 60/589 |
| 3,338,337 A | 8/1967 | Freeland et al. | |
| 3,473,330 A * | 10/1969 | Fritz | 60/588 |
| 3,899,057 A | 8/1975 | Carre | |
| 4,566,277 A * | 1/1986 | Birkenbach | 60/589 |
| 4,679,680 A * | 7/1987 | Komatz | 60/589 |
| 4,823,677 A | 4/1989 | Ore | |
| 4,921,081 A | 5/1990 | Chilcote | |
| 4,924,673 A | 5/1990 | Barker et al. | |
| 5,477,682 A | 12/1995 | Tobiasz | |
| 6,336,525 B1 | 1/2002 | Leng | |
| 6,370,877 B1 | 4/2002 | Lin | |
| 6,502,675 B1 | 1/2003 | Andrus | |

* cited by examiner

Primary Examiner—Thomas E. Lazo
(74) Attorney, Agent, or Firm—Dowrey Rickards PLLC

(57) ABSTRACT

A compact hydraulic cylinder may include a pressure chamber and a reservoir in coaxial, in-line arrangement relative to one another. The pressure chamber and reservoir are separated from one another in use by a piston and hydraulic seal. The piston may be withdrawn to a position in which the pressure chamber and reservoir are in fluid communication through a channel formed in the wall of the cylinder, which may be used for bleeding the pressure chamber. The piston may include a actuator shaft that extends through the reservoir. A follower adjacent the distal end of the shaft seals the reservoir from the exterior of the cylinder.

12 Claims, 3 Drawing Sheets

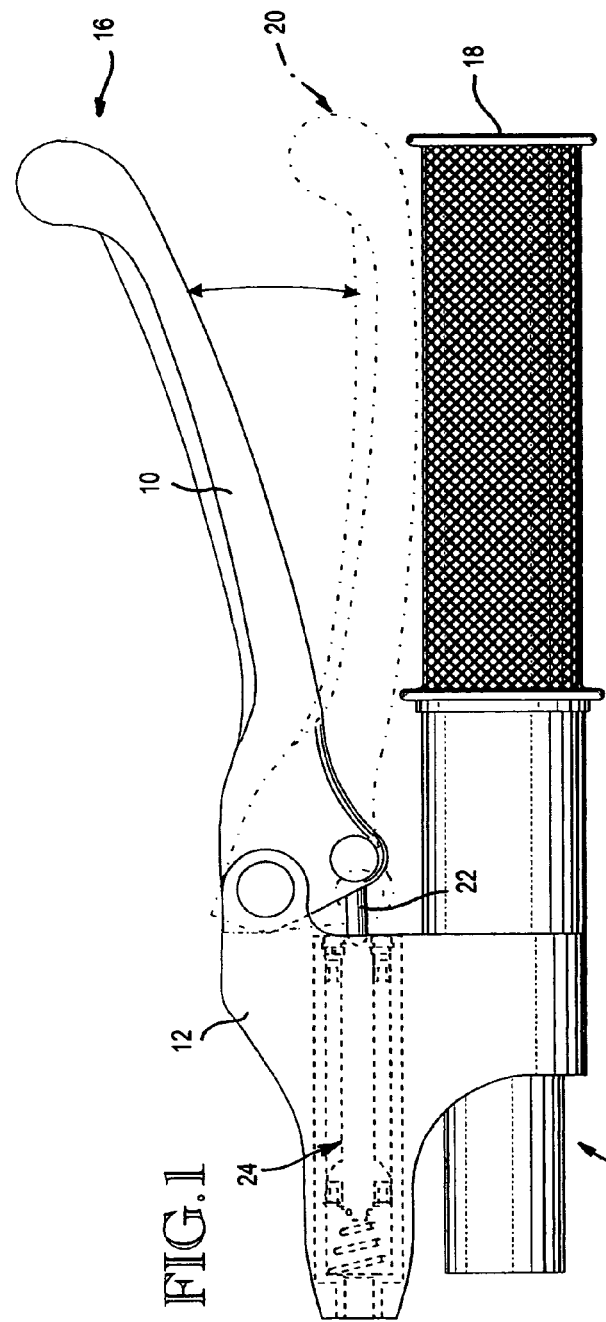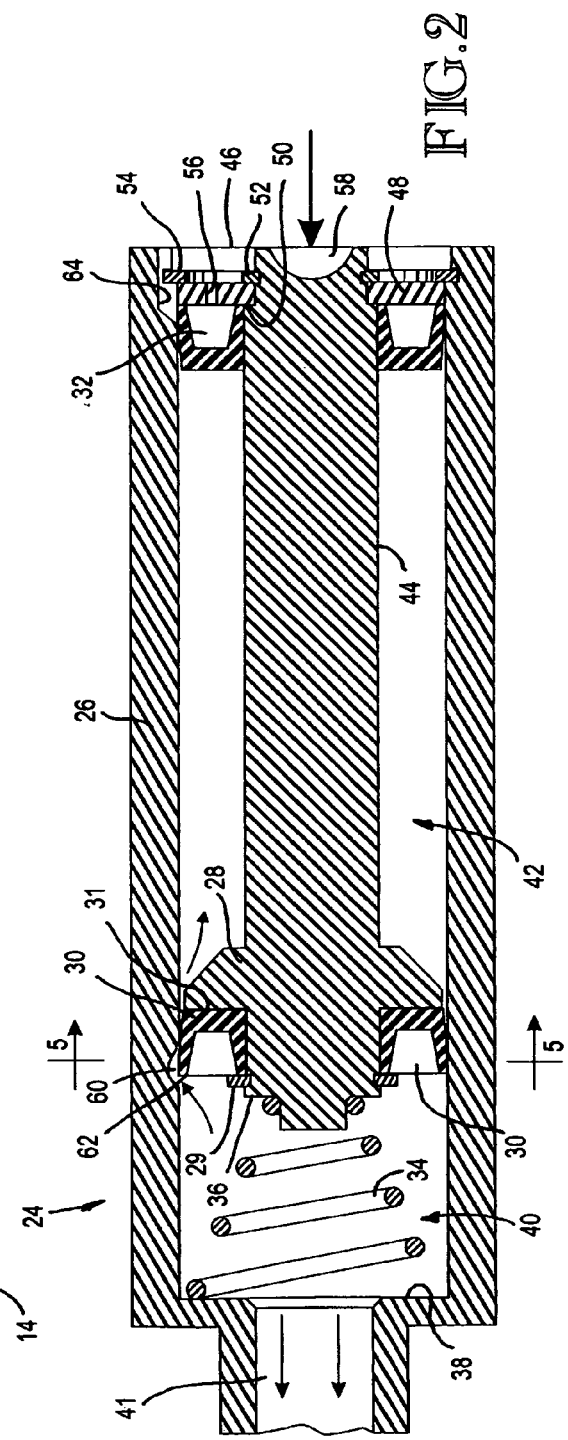

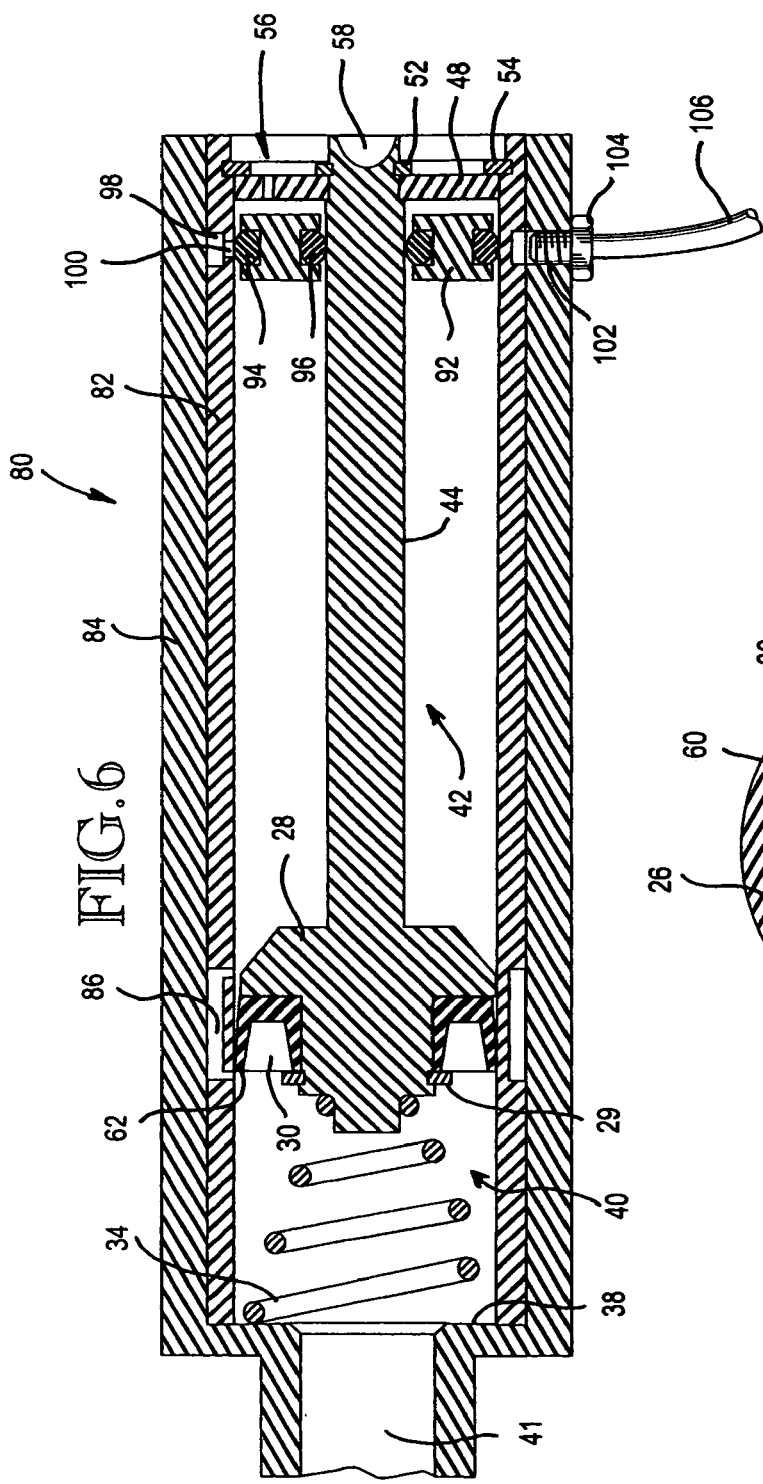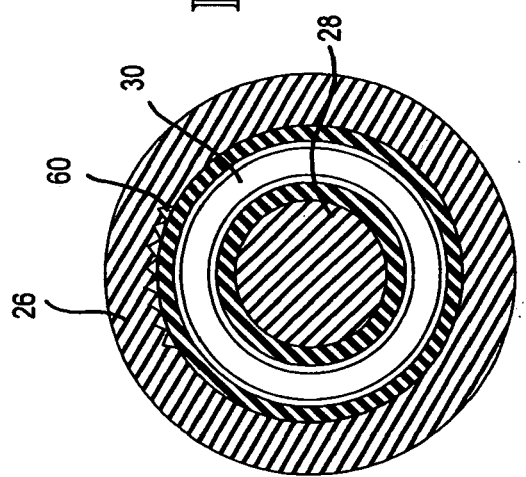

US 7,197,875 B2

HYDRAULIC CYLINDER WITH COAXIAL, IN-LINE RESERVOIR

FIELD OF THE INVENTION

The present invention relates to the field of hydraulic devices and more particularly to hydraulic cylinders.

BACKGROUND

Hydraulic cylinders have a long history of use in regard to automobile and truck applications for actuation of brakes and clutches. Applications for hydraulic cylinders in motorcycles for actuating brakes and clutches are becoming more common, particularly in conjunction with the actuation of disk brakes.

One problem encountered in the use of prior art hydraulic cylinders particularly for motorcycles and other vehicles and equipment with hand-operated controls is the providing of a hydraulic fluid reservoir for the master cylinder. One approach in the field of motorcycles has been to mount a reservoir on the handlebars of the motorcycle and connect the reservoir to the hand-lever-operated hydraulic cylinder using a hydraulic line. This has not been completely satisfactory owing to the increase in the number of parts and the attendant increase in cost and maintenance requirements, the cluttering of the handlebar area and so forth. Annular reservoirs that surround the hydraulic cylinder likewise have been provided, but are less than satisfactory owing to their bulk.

SUMMARY

In one aspect, the present hydraulic device comprises a hydraulic cylinder with a coaxial reservoir in line with the pressure chamber of the pressure cylinder.

BRIEF DESCRIPTION OF THE DRAWINGS

FIG. 1 is a top plan view of a handlebar-lever actuated system with a hydraulic cylinder shown in phantom.

FIG. 2 is a sectional view of a hydraulic cylinder taken along its longitudinal axis.

FIG. 5 is a sectional view of the hydraulic cylinder of FIG. 2 taken along the lines 6—6.

FIG. 6 is a sectional view showing a hydraulic cylinder insert in a housing.

DETAILED DESCRIPTION

Figure 3:
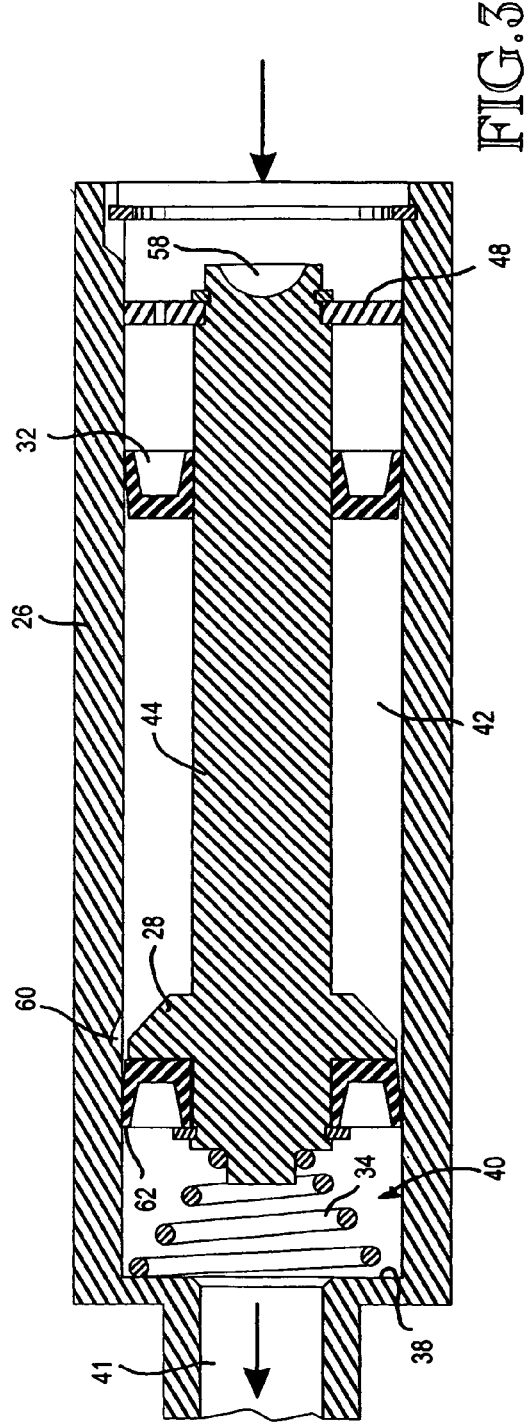
FIG. 3 is a sectional view of a hydraulic cylinder showing the piston in different positions.

As shown in FIG. 1, in one embodiment a motorcycle brake lever 10 is pivotally mounted to a mounting bracket 12 that, in turn, is mounted on a handlebar 14. The lever 10 is pivotable between a first, extended position 16 in which it is remote from the grip 18, and a retracted position 20 (shown in phantom) in which it is proximate to the grip 18. A push rod 22 is also pivotally mounted to the lever 10 at one end of the push rod 22. The distal end of the push rod 22 engages the hydraulic cylinder 24, shown in phantom in FIG. 1.

It should be noted that, while the foregoing discussion has related to a brake lever, any of a number of different means may be used to actuate the hydraulic cylinder 24, and the hydraulic cylinder may be used to actuate any number of devices, such as a clutch, transmission, throttle, and so forth. Further, hydraulic cylinders according to the present invention may be used in applications other than motorcycles, such as in snowmobiles, jet skis, boats, farm and lawn equipment, ATV's, stationary equipment and the like.

Referring to FIGS. 2 and 5, in one embodiment, the hydraulic cylinder 24 comprises a cylinder body 26 and piston 28. The cylinder body defines a bore into which the piston 28 is inserted. The bore is cylindrical and may include two coaxial, in-line cylindrical portions having different diameters. The void may be formed by boring, casting, extruding or other means known in the art. Hydraulic cups 30, 32 are mounted on the piston 28 to provide seals between the cylinder body 26 and piston 28. In the present embodiment, the cup 30 is retained in place on a shoulder 31 on the piston 28 by a retaining ring 29 mounted in a groove in the piston 28. A spring 34 acts between the forward end 36 of the piston 28 and the forward wall 38 of the cylinder body 26. The portion of the interior of the cylinder body 26 from its forward end 38 to the forward end 36 of the piston 28 and seal 30 comprises the pressure chamber 40 of the hydraulic cylinder 24. An outlet 41 is formed in the forward wall 38 of the cylinder body 26 to allow hydraulic fluid to flow out of and back into the pressure chamber 40.

The volume of space between the cups 30, 32 comprises the reservoir 42. The shaft 44 of the piston 28 extends through the reservoir 42, and the cup 32, which is the second seal member, is free to slide along the shaft 44 of the piston 28 in response to changes in the volume of hydraulic fluid in the reservoir 42 and provides a seal both between itself and the shaft and between itself and the bore of the housing 26. The pressure chamber 40 and reservoir 42 are thus coaxial and mounted in line with one another in the hydraulic cylinder of the present embodiment. The diameter of the shaft 44 may be reduced or enlarged to alter the volume of the reservoir 42. In such case, of course, a cup 32 or other sealing member with an inside diameter corresponding to the diameter of the shaft 44 would have to be used. Similarly, the bore of the cylinder body 26 could be enlarged to provide additional reservoir capacity, and in such case, a cup 32 or other sealing member having an appropriately enlarged outside diameter could be used. In the context of a hydraulic braking system, the volume of fluid required by the hydraulic cylinder that actually operates the brake may increase as the brake pads wear. To account for such additional demands for fluid from the reservoir 42, the volume of the reservoir 42 may be chosen as at least twice the volume of the pressure chamber.

As mentioned above, the spring 34 acts between the forward end 36 of the piston 28 and the forward end 38 of the cylinder body 26. This biases the piston 28 toward the open end 46 of the cylinder body 26. An annulus 48 is mounted on the shaft 44 adjacent the distal end of the shaft 44 and is maintained in contact with a shoulder 50 on the shaft by a retaining ring 52 that is mounted in a groove on the shaft 44. Travel of the piston 28 away from the forward end of the cylinder body 26 is restricted by a retaining ring 54 mounted in a groove in the cylinder body 26. This retaining ring 54 is positioned to engage the annulus 48 that, in turn, is engaged with the shoulder 50 on the shaft 44 of the piston 28. The retaining ring 54 thus functions as a stop to limit movement of the piston 28 away from the outlet. An aperture 56 is provided in the annulus 48 to allow a wire or other probe 66 to be extended into the space between the annulus 48 and the cup 32. A socket 58 is provided in the end of the shaft 44 of the piston. The distal end of the push rod 22 may be inserted into the socket such that moving the brake lever 10 from the extended position 16 to the retracted position 20 causes the piston 26 to be moved toward the forward end 38 of the cylinder body, compressing the spring 34 and forcing hydraulic fluid from the pressure chamber 40 through the outlet 41. The socket 58 serves as the force receiver in the present embodiment. In other embodiments, the force may be applied to the shaft through a ball-in-socket joint, a clevis and pin arrangement or in other such manners.

A first channel 60 is formed into the inner wall of the cylinder body 26. As shown in FIG. 5, the channel may comprise a series of parallel groves formed in the inner wall of the cylinder body 26. When the forward lip 62 of the cup 30 is positioned such that it overlaps the channel 60, hydraulic fluid can flow between the reservoir 42 and the pressure chamber 40. The channel 60 may be formed by machining, casting or by other means. The cylinder body 26 may be positioned such that the channel 60 is at the highest point therein so that any residual air in the pressure chamber 40 may be purged through the channel into the reservoir 42. Air may be purged from the reservoir 42 in like manner through the channel 64 formed in the cylinder body 26.

Referring next to FIG. 3, when the shaft of the piston is pushed into the cylinder housing, as by the push rod 22, the cup 30 moves with the piston 28 toward the forward end 38 of the cylinder body 26. As the lip 62 of the cup 30 is moved past the channel 60, communication between the reservoir 42 and the pressure chamber 40 is sealed off, and hydraulic fluid is then forced from the pressure chamber 40 through the outlet 41. As the hydraulic fluid in the reservoir does not have any outlet, the cup 32 travels with the shaft 44 so that the volume of the reservoir remains constant. Of course, if hydraulic fluid is lost from the system, for example, at the cylinder that operates a hydraulic brake or clutch, when the cup 30 is withdrawn so that the lip 62 once again is positioned over the channel 60, such as the position shown in FIG. 2, any deficit of hydraulic fluid in the pressure chamber can be made up by fluid withdrawn from the reservoir 42. In such case, the cup 32 will slide down the shaft 44 of the piston 28 as the volume of hydraulic fluid in the reservoir 42 is depleted.

In an alternate embodiment, as shown in FIG. 6, the hydraulic cylinder 80 comprises a tubular insert 82 that may be inserted into a body that, for example, has a bore sized to receive it. This bore may be formed, for example, in a brake or clutch lever mounting bracket (such as the bracket 12 of FIG. 1) or may be the interior of a cylindrical outer housing 84, as in the embodiment depicted in FIG. 6. The insert 82 should be secured in the bore so that hydraulic fluid does not escape by leaking between the outer wall of the insert 82 and the inner wall of the cylindrical outer housing 84.

A channel 86 is formed in the exterior of the insert 82, as by turning down that portion of the insert 82 on a lathe or milling or otherwise forming the insert, and holes 88, 90 are drilled or otherwise formed in the insert 82 so that the pressure chamber 40 and reservoir 42 communicate with one another through the channel 86 when the lip 62 of the cup 30 is positioned longitudinally in the interior of the insert 82 such that it is between the two holes 88, 90.

Rather than using a second hydraulic cup such as the cup 32 of FIG. 1, in this embodiment, an annular mount 92 is slidably mounted on the shaft 44 of the piston 28, and forms a seal between the inner wall of the insert 82 and the shaft 44 by means of O-rings 94, 96 or other inner and outer seal elements mounted on the annular mount 92. The annular mount 92 can thus travel with the piston 28 and shaft 44 when the piston is moved toward or away from the forward end 38 of the assembly. The annular mount 92 may also move along the shaft relative to the piston 28 in response to changes in the volume of fluid in the reservoir 42. Together, the annular mount 92 and the O-rings 94, 96 comprise a follower whose position on the shaft changes depending on the movement of the piston to and fro and the change in volume of the reservoir fluid.

A drain channel 98 is machined or otherwise formed in the exterior of the cylindrical insert 82, and a hole or holes 100 are drilled or otherwise formed such that they extend from the drain channel 98 into the interior of the cylindrical insert 82. When the annular mount 92 is positioned sufficiently proximate to the annulus 48, the reservoir 42 can communicate with the drain channel 98 through the hole or holes 100, for example, for bleeding air or hydraulic fluid out of the reservoir 42.

A threaded hole 102 may be provided in the housing 84 in a position such that it communicates with the drain channel. A bleed plug 104 may be screwed into the hole 102. Bleeding of hydraulic fluid may be facilitated by a bleed tube 106 attached to the bleed plug 104.

In use, when a force is applied to the shaft 44, as through the socket 58, the piston 28 moves from a position remote from the outlet 41 (see, e.g., FIG. 2) toward the forward end 38 of the pressure chamber 40. At full compression, the piston 28 ultimately comes to rest in a position proximate to the outlet. As the piston 28 moves, the return spring 34 is compressed. Until the forward lip 62 of the cup 60 has moved past the channel 60, hydraulic fluid is free to flow from the pressure chamber 40 through the channel 60 and into the reservoir 42.

After the lip 62 of the cup 30 has moved past the channel 60, the reservoir 42 is sealed from the pressure chamber 40 by the cup 30. As such, the hydraulic fluid in the pressure chamber 40 is thereafter forced through the outlet 41 as the piston 28 and cup 30 move toward the forward end of the cylinder body.

Upon release of the force applied to the piston 28 through the shaft 44, the spring 34 urges the piston 28 away from the front end of the cylinder body, and hydraulic fluid returns to the pressure chamber through the outlet 41. When the lip 62 of the cup 30 is no longer forward of the channel 60, hydraulic fluid can flow from the reservoir 44 into the pressure chamber 40. If the hydraulic cylinder (not shown) operated by the hydraulic cylinder 24 requires additional fluid, as may be occasioned by wear of brake pads in the event that the hydraulic cylinder is used to actuate a hydraulic brake mechanism, additional hydraulic fluid may flow from the reservoir into the pressure chamber 40 when the cup 30 is positioned such that the channel 60 communicates freely with both the reservoir 42 and pressure chamber 40. This may cause the follower cup 32 to move along the shaft 44 of the piston 28 toward the cup 30, decreasing the volume of the reservoir 42.

Ultimately, movement of the piston 28 away from the forward end 38 of the cylinder body 26 is limited by the retaining ring 54 that prevents further movement of the annulus 48, and hence the piston 28, out of the distal end of the cylinder body 26.

Figure 4:
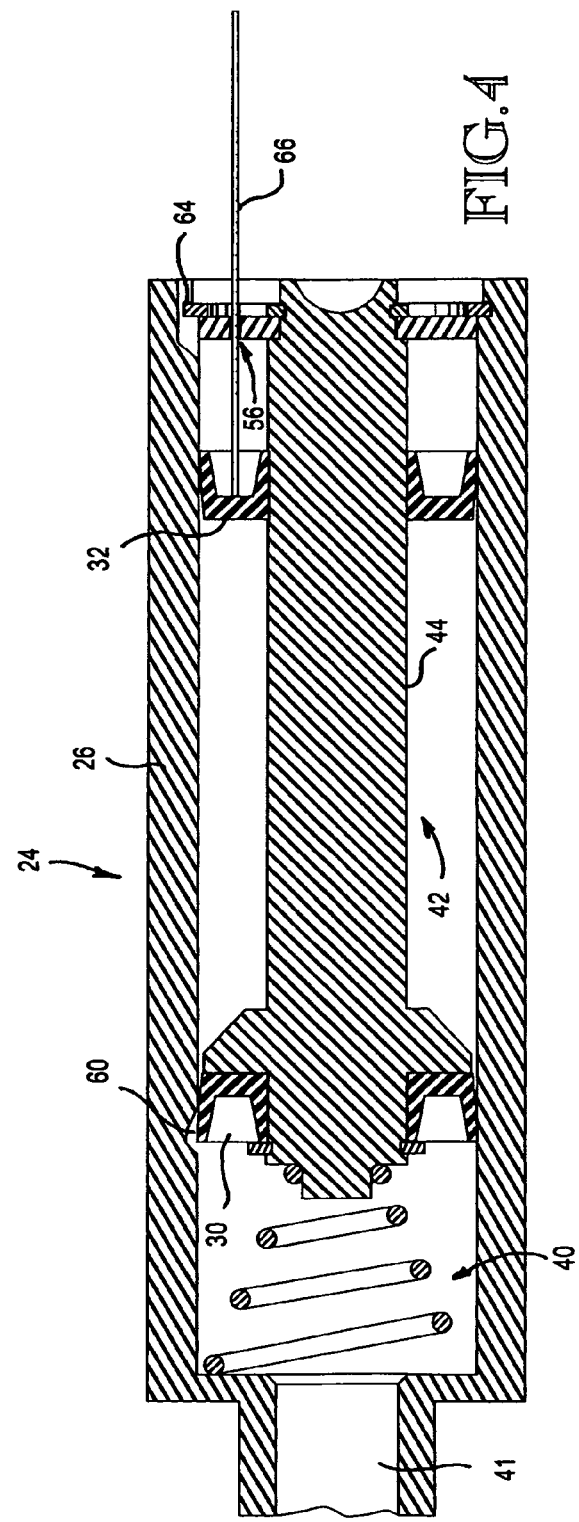
FIG. 4 is a sectional vie of a hydraulic cylinder with the piston positioned such that the reservoir and pressure chamber are in fluid communication.

Fluid may flow through the channel 64 when the lip of the cup 32 has moved past the front end of the channel 64. Referring to FIG. 4, the amount of fluid remaining in the reservoir may be checked using a wire probe 66 that may be inserted through the aperture 56 in the annulus 48. The reservoir 42 may be refilled, for example, by adding fluid through a bleed port (not shown) downstream of the hydraulic cylinder 24, such as a bleed port associated with an actuator (not shown) that is operated by the hydraulic cylinder. Fluid may be flowed through the hydraulic cylinder 24 until the reservoir 42 is filled and any air has been bled from the hydraulic cylinder 24. The reservoir 42 may also be refilled by partial disassembly and reassembly of the hydraulic cylinder 24 with the addition of hydraulic fluid to the system.

It will be appreciated by those skilled in the art that the coaxial, in-line design of the hydraulic cylinders 24, 80 of the embodiments of the invention do not rely on gravity feed. Further, the cup 32 and follower 92 as shown, for example, in FIGS. 2 and 7, may be in hydraulic lock with the cup 30 that is mounted on the piston. As the reservoir 42 is sealed from the outside in these embodiments by the cup 32 or follower 92, the hydraulic cylinders 24, 80 may be used in a variety of environments, including in environments in which the cylinders 24, 80 are exposed to or immersed in water. As the cup 32 or follower 92 may be in hydraulic lock with the cup 30, the orientation of the hydraulic cylinder 24, 80 is of lesser importance. The hydraulic cylinders 24, 80 could even be used in a weightless environment or in an environment in which its orientation and position are changeable. The use of the channels 60, 64 rather than the use of external tubes or the like may provide an externally clean design that may be easily mounted as desired.

Although the present invention has been described in considerable detail with reference to certain preferred embodiments, other embodiments are possible. Therefore, the spirit or scope of the appended claims should not be limited to the description of the embodiments contained herein.

I claim:

1. A hydraulic cylinder comprising:
    a housing having a bore of cylindrical cross-section and having an outlet adjacent one end thereof;
    a piston having a seal mounted thereon and a shaft extending therefrom, the piston being slidably and sealingly inserted into the housing and being movable therein from a position proximate to the outlet to an extended position remote from the outlet, a pressure chamber being formed between the seal mounted on the piston and the one end of the housing;
    a second seal member slidably mounted on the shaft at a position within the bore of the cylinder, the second seal providing a seal between the shaft and the bore of the housing, and being slidable with respect to the housing, a fluid reservoir being formed within the housing between the seal mounted on the piston and the second seal member, the pressure chamber being in line with one another and being coaxial;
    a channel providing fluid communication between the pressure chamber and the reservoir when the piston is in its remote position.

2. The hydraulic cylinder of claim 1 wherein the channel comprises a plurality of grooves formed in the interior wall of the housing.

3. The hydraulic cylinder of claim 1 wherein the volume of fluid containable in the reservoir is at least twice the volume of fluid displaceable from the pressure chamber by movement of the piston from the position remote from the outlet to the position proximate to the outlet.

4. The hydraulic cylinder of claim 1 wherein the seal mounted on the piston comprises a hydraulic cup seal, and wherein the hydraulic cup seal is fixedly mounted on the piston.

5. The hydraulic cylinder of claim 1 wherein the bore of the housing bounding the pressure chamber and the bore of the housing bounding the reservoir are the same.

6. The hydraulic cylinder of claim 1 further comprising a second channel formed in the housing for providing fluid communication between the reservoir and the outside.

7. The hydraulic cylinder of claim 6 wherein the seal and second seals are in hydraulic lock with one another when the seals are positioned such that the reservoir and pressure chamber are not in fluid communication with one another and the second seal is positioned relative to the second channel such that there is no fluid communication between the reservoir and the exterior of the hydraulic cylinder through the second channel.

8. The hydraulic cylinder of claim 7 further comprising an annulus mounted on the shaft and movable therewith, the annulus including an aperture extending therethrough for admitting a probe to contact the second seal, the length of the probe extendable through the aperture being indicative of the quantity of fluid contained in the reservoir when the piston is in a retracted position.

9. The hydraulic cylinder of claim 1 further comprising a stop for restricting movement of the piston away from the outlet.

10. The hydraulic cylinder of claim 1 wherein the seal and second seals are in hydraulic lock with one another when the seals are positioned such that the reservoir and pressure chamber are not in fluid communication with one another.

11. A hydraulic cylinder comprising:
    a housing having a bore of cylindrical cross-section and having an outlet adjacent one end thereof;
    a piston having a seal mounted thereon and a shaft extending therefrom, the piston being slidably and sealingly inserted into the housing and being movable therein from a position proximate to the outlet to an extended position remote from the outlet, a pressure chamber being formed between the seal mounted on the piston and the one end of the housing;
    a second seal member and slidably mounted on the shaft at a position within the bore of the cylinder, the second seal providing a seal between the shaft and the bore of the housing, a fluid reservoir being formed within the housing between the seal mounted on the piston and the second seal member, the pressure chamber being in line with one another and being coaxial;
    a channel providing fluid communication between the pressure chamber and the reservoir when the piston is in its remote position;
    wherein the housing comprises a tubular insert inserted into the bore of a body, and wherein the channel is formed in the tubular insert.

12. A hydraulic cylinder comprising:
    a housing having a bore of cylindrical cross-section and having an outlet adjacent one end thereof;
    a piston having a seal mounted thereon and a shaft extending therefrom, the piston being slidably and sealingly inserted into the housing and being movable therein from a position proximate to the outlet to an extended position remote from the outlet, a pressure chamber being formed between the seal mounted on the piston and the one end of the housing;
    a second seal member and slidably mounted on the shaft at a position within the bore of the cylinder, the second seal providing a seal between the shaft and the bore of the housing, a fluid reservoir being formed within the housing between the seal mounted on the piston and the second seal member, the pressure chamber being in line with one another and being coaxial;

a channel providing fluid communication between the pressure chamber and the reservoir when the piston is in its remote position;

wherein the second seal comprises an annulus on which are mounted inner and outer seal elements.

* * * * *